United States Patent [19]
Soldati et al.

[11] 4,020,019
[45] Apr. 26, 1977

[54] ANTICARIES AGENTS

[76] Inventors: Gianluigi Soldati, 486 Flock Road, Mercerville, N.J. 08619; Ralph G. Eilberg, 46 Seventh St., Cresskill, N.J. 07626; Helga Melger, 60 Taft Ave., Edison, N.J. 08817; William M. Wooding, 24 Bertrand Drive, Princeton, N.J. 08540

[22] Filed: Jan. 29, 1975

[21] Appl. No.: 545,030

[52] U.S. Cl. .............................. 260/2 EN; 260/2 P; 424/52
[51] Int. Cl.$^2$ ................. C08G 73/04; C08G 79/02
[58] Field of Search ................ 260/2 EN, 2 P, 2 R; 424/52

[56] References Cited
UNITED STATES PATENTS 3,711,604  1/1973  Colodney et al. .................. 424/52

FOREIGN PATENTS OR APPLICATIONS 976,568   11/1964  United Kingdom
1,345,843  2/1974  United Kingdom

*Primary Examiner*—Wilbert J. Briggs, Sr.
*Attorney, Agent, or Firm*—Kevin B. Clarke

[57] ABSTRACT

Polyethylenimine mono-and difluorophosphates are obtained by the reaction of solutions of polyethylenimines with monofluorophosphoric acid or difluorophosphoric acid at low temperatures. The novel polyethylenimine salts have demonstrated valuable properties in the prevention of dental caries.

8 Claims, No Drawings

ANTICARIES AGENTS

The present invention relates to novel chemical compounds. More particularly, the invention relates to the novel compounds which represent valuable improvements in oral and dental hygiene.

Much progress has been made during the past few years in the field of dental hygiene. However, the numerous and complex problems associated with the field create an ever increasing demand for new products designed to control or alleviate these problems.

Dental caries, i.e. tooth decay is a disease characterized by the dissolution of the mineral portion of the tooth apparently caused by acids produced by bacteria as an end product of their metabolism. If permitted to go unchecked, the disease ultimately attacks and penetrates the pulp chamber of the tooth resulting in pain and loss of viability of the tooth which may necessitate extraction or costly repair of the tooth.

Dental clinical investigators have long wrestled with such problems as alleviating and/or preventing dental caries. It is recognized that a clean tooth will not decay. However, it is also virtually impossible to keep the teeth continuously clean. Thus the initiation of carious lesions is usually accomplished in spite of the most vigorous cleansing regimen.

Several methods have been developed, with varying results, to reduce the incidence of tooth decay.

Antibiotics such as penicillin have been suggested for reducing dental caries and dentifrices containing penicillin have been tested and found to be effective. However, the antibiotics are not selective in the destruction of oral bacteria and destroy both the useful and harmful bacteria in the mouth indiscriminately resulting in a microbial imbalance in the mouth which can have serious consequences.

In addition, it has been that the application of alkali metal or tin fluorides to the teeth topically, in drinking water and in dentifrice preparations containing such fluoride compounds which release fluoride ions in water can be beneficial. While the fluoride compounds have been found to be effective, it has been found that some fluoride compounds tend to lose their effectiveness upon aging. At best, fluoride reduces caries by about 20% when used in toothpaste. This problem is of particular significance with respect to dental creams which contain water or similar solvent material.

Further, it has been proposed to prevent dental caries by coating the tooth surfaces with a polymeric material. However, this proposal suffers from the following drawbacks; firstly, in order to obtain a strong bond to the tooth surface, the teeth must first be etched with phosphoric acid; secondly, this treatment has been found to be effective only in young children who have not yet developed dental caries.

In accordance with the present invention it has been discovered that films are produced upon the interaction of certain novel polyethylenimine mono- and difluorophosphates of various molecular weights with tooth surfaces. The presence of the films thus produced protects the tooth surface from attack by acid and provide a source of fluoride ions which reduces solubility of tooth enamel in acid solutions.

The new compositions of the present invention may be represented by the following general formula:

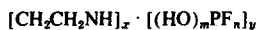

wherein $x$ represents the number of monomer units of ethylenimine used and can have a value of from 7.5 to 1,500 depending on the average molecular weight of the polyethylenimine and $y$, can have a value of up to 80% of $x$; $m=2$ when $n=1$, or $m=1$ when $n=2$. The polyethylenimines used in preparing the fluorophosphates of the present invention have average molecular weights ranging from 300 to 40,000. Exemplary of the polyetheneimine starting materials are: PEI-3 (MW 300), PEI-6 (MW 600), PEI-12 (MW 1200), PEI-18 (1800), POLYMIN-P or PEI-P (MW 40,000), PEI-200 (MW 20,000–30,000), PEL-400 (MW 30,000–40,000) and PEI-600 (MW 40,000–60,000).

The fluorophosphate derivatives of polyethylenimine which are the subject of the present invention are prepared by reacting a solution of a polyethylenimine, a highly branched polyamine in which the primary, secondary and tertiary amine nitrogen undergoes salt formation, with a solution of a mono- or difluorophosphoric acid.

In general, polyethylenimine mono and difluorophosphates can be prepared by slowly combining aqueous or alcoholic solutions of the polyethylenimine with a aqueous or alcoholic solutions of mono or difluorophosphoric acid. The alcoholic solutions are preferred in both cases, and the lower alcohols i.e. methanol, ethanol or isopropanol are particularly suitable. The solutions are combined at temperatures ranging from about 5° to about 25° C at a rate such that the temperature of the reactants and resulting reaction mixture is kept as nearly constant as is possible throughout the combination step. Salts are obtained by titrating the PEI alcoholic solution to a pH of seven or in the vicinity thereof, or by adding an excess of acid solution (to a pH of four to five) and recovering the salt after careful washing with alcohol.

The following specific examples describe the preparation of the novel compounds of the present invention.

EXAMPLE I

Polyethylenimine-6 (average MW=600), 5g., is dissolved by stirring in 350 ml of anhydrous isopropanol at room temperature. A solution of monofluorophosphoric acid in anhydrous isopropanol (20 g. acid, 80 g alcohol) is added dropwise to pH 4.9. A total of 47.3 ml of acid solution are required. The precipitate is collected and washed three times with isopropanol followed by anhydrous ether. The solid is then dried over sulfuric acid in a vacuum dessicator 13 g. yield.

EXAMPLE II 10 g. of Polymin P (50% aqueous solution ) in 200 ml of water are titrated with a 20 g. monofluorophosphoric acid - 80 g. isopropanol solution to pH 7.06. The clear solution is evaporated under reduced pressure to eliminate the alcohol. The residue is then adjusted with water to obtain 100 g of solution. Similarly the Polymin P, 50% aqueous solution, is freed of all the water present by refluxing it with 400 ml of benzene in presence of a Dean-Stark water trap. The benzene is decanted off the residue dissolved in anhydrous isopropanol. 7 g. of residue titrated to pH 6.9 yielded 5.5 g. of solid material.

Similarly the difluorphosphates are prepared by reating the Polyethylenimine with difluorophosphoric acid as follows:

EXAMPLE III

To a solution of 5.2 g. of Polyethyleminime-12 (average MW=1200 in 300 ml. of anhydrous isopropanol, there is added an alcoholic solution of difluorophosphoric acid until the reaction mixture reaches pH 6.6. The precipitate is filtered and washed several times, first with isopropanol then ahydrous ethyl ether. After drying in a dessicator 4.5 g. of material are obtained.

We have found that salts of polyethylenimines with monofluorophosphoric acid and difluorophosphoric acid are useful in the prevention of dental caries. Although not wishing to be bound by the following theory, we have acquired evidence to demonstrate that the polyethylenimine fluorophosphates bind to the tooth surface and reduce acid solubility in two ways. First, the polyethylenimine film itself is impermeable to acid and second the fluorophosphate portion provides available fluoride ion at the tooth surface thereby providing a sustained fluoride action on the tooth surface.

The efficacies of the materials of this invention as anticaries agents were determined by measuring the reduction of acid solubility of hydroxyapatite or extracted human teeth, as follows:

Powdered Hydroxyapatite (HAP), 50 mg., is exposed for ten minutes to 10 ml of an aqueous test solution of the material of the prsent invention at various concentrations. The sample is centrifuged, the HAP washed twice with water, and to this, 10 ml of acetic acid (pH3) are added and the mixture filtered after ten minutes. From the filtrate, 0.2 ml aliquots ar taken and added to 4.8 ml 0.5N $H_2SO_4$, and 0.3 ml of reducing agent 2,4-diaminophenol, 1% solution, in 10% $NaHSO_3$ are added. After five minutes the resulting solution is examined spectrophotometrically to determine the total inorganic phosphorous and compared to a control of hydroxyapatite not previously exposed to the fluorophosphates of this invention, thus determining the reduction of acid solubility.

Similarly, one extracted human tooth is exposed for ten minutes to 10 ml of an aqueous test solution of a material of the present invention at various concentrations. The tooth is removed, and washed twice with water, and then placed in 10 ml of acetic acid ($H_3$). After 10 ml aliquots are taken and added to 4.8 ml of a 0.5N $H_2SO_4$, to which 0.3 ml of a reducing agent (2,4-diaminophenol, 1% solution in 10% $NaHSO_3$) is added. After five minutes the resulting solution is examined spectrophotometrically to determine the total inorganic phosphorous as compared with a control, thus determining the reduction of acid solubility. The control is obtained using the same tooth before exposure to the test solution.

Following are some of the results obtained in acid solubility reduction studies carried out on HAP with polyethylenimine fluorophosphates of the present invention.

TABLE 1

| Anticaries Agent | conc. | pH solution | % reduction of acid solubility of HAP |
|---|---|---|---|
| PEI-3 monofluorophosphate | 1.0% | 5.00 | 64.0 |
|  | 4.0% | 5.00 | 68.8 |
|  | 8.0% | 5.00 | 71.1 |
| PEI-6 monofluorophosphate | 1.0% | 5.00 | 64.9 |
|  | 4.0% | 5.00 | 71.1 |
|  | 8.0% | 5.00 | 73.7 |
| PEI-12 monofluorophosphate | 1.0% | 5.00 | 54.5 |
|  | 4.0% | 5.00 | 64.3 |
|  | 8.0% | 5.00 | 67.9 |

TABLE 1-continued

| Anticaries Agent | conc. | pH solution | % reduction of acid solubility of HAP |
|---|---|---|---|
| PEI-P monofluorophosphate | 1.0% | 5.00 | 58.4 |
|  | 4.0% | 5.00 | 62.8 |
|  | 8.0% | 5.00 | 63.7 |
| PEI-3 difluorophosphate | 1.0% | 5.00 | 54.5 |
|  | 4.0% | 5.00 | 58.9 |
|  | 8.0% | 5.00 | 64.3 |
| PEI-6 difluorophosphate | 1.0% | 5.00 | 53.6 |
|  | 4.0% | 5.00 | 58.0 |
|  | 8.0% | 5.00 | 70.0 |
| PEI-12 difluorophosphate | 1.0% | 5.00 | 61.6 |
|  | 4.0% | 5.00 | 66.6 |
|  | 8.0% | 5.00 | 90.8 |
| PEI-18 difluorophosphate | 1.0% | 5.00 | 53.5 |
|  | 4.0% | 5.00 | 64.6 |
|  | 8.0% | 5.00 | 69.2 |
| PEI-P difluorophosphate | 1.0% | 5.00 | 59.6 |
|  | 4.0% | 5.00 | 68.4 |
|  | 8.0% | 5.00 | 69.4 |

These compounds have been shown to retain their effectiveness absorbed to hydroxy apatite or human teeth after several washings with water.

In addition tooth surfaces were coated with a low average MW (MW 600) and a high (MW 40,000) polyethylenimine difluorophosphate of the present invention and brushed with dentifrice compositions containing abrasive cleaners as well as with an abrasive suspension (dicalcium phosphate dihydrate). Approximately half or more of the film formed using the compounds of the present invention is retained after brushing with dentrifrices or an abrasive suspension.

The compositions of the present invention can be applied to the teeth in solid or liquid form in conjunction with a carrier such as a toothpaste, mouthwash, tooth powder or other orally applied form. The preferred method of application is in the form of a mouthwash includes the usual dispersing or wetting agents such as ethanol or glycerine which insures the deposition of the film forming agents of the present invention over the entire surfaces of the teeth.

The following formulations are typical but not limiting mouthwash formulations which include the novel polyethylenimine fluorophosphates of the present invention.

| Ingredient | Formulation No. 1 (parts by weight) | Formulation No. 2 (parts by weight) |
|---|---|---|
| Glycerine | 15.0 | 15.0 |
| Ethanol | 15.0 | — |
| Water | 66.0 | 81.0 |
| PEI-6-DFP* | 4.0 | 4.0 |
|  | 100 | 100 |

*Polyethylenimine-6 Difluorophosphate

Numerous modifications and variations of the present invention will be obvious to those skilled in the art in light of the foregoing specification and the invention may be practised in a manner other than as specifically set forth and fall within the scope of the appended claims.

What is claimed is:

1. A method of preparing polyethylenimines of the formula:

$[CH_2CH_2NH]_x \cdot [(HO_mPF_n]_y$ wherein $x$ has a value of 7.5 to 1000 and m and n are positive whole integers whose sum is three and y has a value of up to 80% of $x$ which comprises combining an aqeuous or alcoholic solution of a polyethylenimine reactant having a molecular weight of from about 300 to about 40,000 with an aqueous or alcoholic solution of an acid reactant selected from the group consisting of mono and difluorophosphoric acid at temperatures ranging from about 5° C to about 26° C at a rate such that the temperature of said reactant solutions and the resulting reaction mixture is kept as nearly constant as possible throughout the combination step and recovering the desired solid polyethylenimine fluorophosphate.

2. A method according to claim 1 wherein said polyethylenimine has an average molecular weight of about 600.

3. A method according to claim 1 wherein said polyethylenimine has an average molecular weight of about 1200.

4. A method according to claim 1 wherein said polyethylenimine has an average molecular weight of about 300.

5. A dental propylaxis comprising a vehicle and a polyethylenimine produced in accordance with the method of claim 1.

6. A dental prophylaxis according to claim 5 wherein the polyethylenimine fluorophosphate is polyethylenimine 6 mono or difluorophosphate.

7. A dental propylaxis according to claim 5 wherein said polyethylenimine fluorophosphate is polyethylenimine-12 mono or difluorophosphate.

8. A dental prophylaxis according to claim 5 wherein said polyethylenimine fluorophosphate is polyethylenimine-3-difluorophosphate.

* * * * *